Patented Mar. 12, 1929.

1,704,718

UNITED STATES PATENT OFFICE.

ALFRED OWEN TORRANCE BEARDMORE, OF TORONTO, ONTARIO, CANADA.

PROCESS FOR THE TREATMENT OF LEATHER.

No Drawing.    Application filed March 24, 1928.   Serial No. 264,574.

Hides are disfigured by scars resulting from healed wounds, scratches, and cuts, and particularly by those resulting from the activities of various insects parasitic in vertebrate animals, and the hides of the Bovidæ are particularly susceptible to disfigurement by the warble fly. This fly deposits its larva to hatch and live in and on the hide organism of the living animal, and causes while in a maggot state the formation of a tumor which, when the fly develops from the maggot, bursts and liberates it, and then heals but leaves a scar that mars the appearance of the finished leather.

It is known that these scars do not impair the durability of the leather or its utilitarian qualities, but do lower its grade or classification and detract from its selling price, and to avoid the resultant financial loss due to the disfigurement my present invention is directed to a process or method, for the effacement or obliteration of the scars, and comprises the following sequence of steps:—

(a) Subjecting the tanned hide, when taken from the dry loft in a thoroughly dried condition, to moisture until the water absorbed ranges from 20% to 25% of the weight of the leather;

(b) Placing the moistened hide in a pile, in a closed room, at ordinary atmospheric temperature and keeping it free from air currents until the moisture has penetrated evenly to all parts of the fibre, so that it can be compressed into a dense mass;

(c) Spraying the surface of the hide, while in a thoroughly moistened condition, with a mixture of mineral and vegetable oils heated to a temperature of approximately 140° C. for penetrating the grain and preventing the burning of the leather by the burnishing roll;

(d) Rough rolling the moistened and sprayed hide for packing the fibre and smoothing the grain, and (e) Then subjecting the oil sprayed and partly burnished hide while in the moistened condition to the compressing action of an embossing surface, which may be a disc, roll or plate.

The embossing operation is conducted at a temperature of from 80° to 110° F., to avoid varying or affecting the color of the leather, and at a pressure of approximately 12,000 lbs. per sq. inch for making an accurate imprint of the embossed design on the leather and for closely packing or compressing the fibre into a denser mass than in its natural state and thus developing to the maximum degree its wearing and water resisting qualities.

The process is primarily devised for the treatment of vegetable tanned sole leather which visibly displays on the grain side scars resulting from any cause whatever, but it may also be employed for the treatment or ornamentation of other leathers as it is not intended that it should be confined merely to the obliteration of scars or blemishes.

Having thus fully described my invention, what I claim as new and desire to secure by Letters Patent is:

1. A process for the treatment of leather which consists of subjecting the tanned hide to moisture until the water absorbed ranges from 20% to 25% of the weight of the leather, placing the moistened hide in a closed room at ordinary atmospheric temperature and keeping it free from air currents until the moisture has penetrated evenly to all parts of the fibre, spraying the surface of the hide while in a thoroughly moistened condition with a mixture of mineral and vegetable oils heated to a temperature of approximately 140° F., rough rolling the moistened and sprayed hide for packing the fibre and smoothing the grain, and then subjecting it while still moistened to the action of an embossing surface.

2. A process for the treatment of leather which consists of subjecting the tanned hide to moisture until the water absorbed ranges from 20% to 25% of the weight of the leather, placing the moistened hide in a closed room at ordinary atmospheric temperature and keeping it free from air currents until the moisture has penetrated evenly to all parts of the fibre, spraying the surface of the hide while in a thoroughly moistened condition with a mixture of mineral and vegetable oils heated to a temperature of approximately 140° F., rough rolling the moistened and sprayed hide for packing the fibre and smoothing the grain, and then subjecting it while still moistened to the action of an embossing surface operating at a pressure of approximately 12,000 lbs. per sq. inch at a temperature ranging from 80° to 110° F.

Dated at the city of Toronto, in the county of York, and Province of Ontario, Dominion of Canada, this 27th day of February, 1928.

ALFRED OWEN TORRANCE BEARDMORE.